UNITED STATES PATENT OFFICE.

SADAKICHI SATOW, OF SENDAI, JAPAN.

PROTEIDAL COMPOSITION AND PROCESS OF MAKING THE SAME.

1,245,984.     Specification of Letters Patent.     Patented Nov. 6, 1917.

No Drawing.     Application filed May 17, 1917. Serial No. 169,199.

*To all whom it may concern:*

Be it known that I, SADAKICHI SATOW, a subject of the Emperor of Japan, residing at Sendai, Japan, have made a certain new and useful Invention in Proteidal Compositions and Processes of Making the Same, of which the following is a specification.

This invention relates to vegetable proteidal compositions and the process of making the same.

The object of the invention is to provide a vegetable proteidal composition suitable for use in the manufacture of various commercial products, such a linoleum, wood carpet, floor coverings, boards, tiles, insulating compounds, rubber substitutes, celluloid-like articles, and the like.

A further object of the invention is to provide a process for making such a composition which is economical, and wherein the waste material in carrying out part of the process is utilized in the composition product.

Other objects of the invention will appear more fully hereinafter.

In carrying out my invention I obtain vegetable proteids or proteidal substances from any suitable material, such as beans, peas, wheat, corn, or other leguminous, cereal or grain products, or from the residue from sugar and starch factories, oil manufacture, breweries, distilleries, or the like. I shall refer to these substances as "raw material" intending to include thereby not only fresh materials but also residues, as indicated.

The proteid containing raw material, particularly in the case of leguminous, cereal, or grain products, is crushed to break down the cellular structure thereof, and if such raw material contains an undesirable percentage of oil the oil content is removed in any suitable manner, as, for example, by treating the mass with an oil solvent, such as benzin. The oil solvent is then removed from the mass.

From the "meal" or "proteid meal" thus obtained, whether from fresh raw material or from residues from the manufacture of other products, the vegetable proteids or proteidal substances are separated, and, if desired, are refined into more or less pure state. The separation of the proteidal substances from the mass of raw material, or from the "meal" may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom.

The further purification of the proteidal liquid obtained as above described may be accomplished by filtration, centrifuging, or the like, by fractional precipitation, fractional solution of precipitated impure proteids, or by converting one or more components into other chemical compounds having different properties which enable their separation to be effected, or one or more of these various purifying methods may be employed in conjunction with others.

The precipitation of the refined proteidal substances is accomplished by adding a suitable acid, such as sulfuric, sulfurous, acetic, or phosphoric acid, or by adding a suitable ferment, such as lactic or acetic.

According to another method the "meal" is treated with water, and the refined proteidal product is precipitated out of the resulting liquid, either with or without purification thereof, as above explained, the precipitation being effected by an acid or a ferment, as above described.

According to still another method the meal is treated with an aqueous salt solution, such as sodium chlorid, ammonium sulfate, or the like, and the resulting liquid, either with or without further purification, as explained, is subjected to dialysis.

The residue or waste remaining of the "meal," after separation of the proteidal substances therefrom, and of the proteidal liquid or extract in the purification process, and to which residues, whether from the extraction or the purification operation, I shall refer as "proteidal residue," contain nitrogenous and other substances, and some unseparated proteids. This proteidal residue forms an excellent and very cheap filler or binder for compositions for use in conjunction with the separated proteids, after the latter are treated, as hereinafter described, in the manufacture of various commercial products, such as lineoleum, wood carpet, floor coverings, boards, tile, insulating compounds, rubber substitute, celluloid-like articles, and the like. It is the special object of the present invention to utilize this proteidal residue for the purpose mentioned, thereby greatly reducing the cost of manufacture of the articles referred to.

The proteidal residue may be used alone as a filler or binder, or the separation and precipitation residues may be mixed together, or with other materials or substances to form the required filler or binder.

In the preparation of the composition of my invention, the proteidal substances, obtained as above described, are subjected to the action of a glutinizing agent to produce a sticky viscid mass. I have found the following to be suitable glutinizing agents, namely, (1) inorganic acids, such as phosphoric acid, sulfurous acid, and the like; (2) fatty or oxy-fatty acids, such as formic, acetic, propionic, phenyl-propionic, malonic, lactic, tartaric, citric, matic, and the like; (3) aromatic acids, such as salicylic, benzoic, or the like; (4) phenols, such as carbolic acid, cresol, resorcin, nitro-creosol, and the like; (5) organic bases, such as pyridin, urea, anilin, glycin, naphthylamin, or other amino compounds, or the like; (6) organic bases such as caustic alkali, ammonia, or the like; or (7) alkali salts of weak acids, such as borax, sodium phosphate, and the like.

The properties of the glutinized mass which particularly adapt it for use in the manufacture of the various commercial products, above mentioned, are greatly improved if one or more of the following compounds are added thereto, namely, difficultly drying, sticky, or viscid substances, such as oxidized oils, triphenyl-glycerin, or the like, or hydrocellulose, oxycellulose, cellulose esters and the like, which I will herein call cellulose derivatives, or other viscous compounds; or active methylene compounds, such as formaldehyde, hexamethylenetetramin, trioxymethylene, or other aldehydes, of aliphatic and aromatic series.

The properties of the mass are still further improved if a small quantity of alkali is also added thereto.

To the glutinized mass, obtained as above described, and whether or not containing the sticky or viscid substances, cellulose derivatives, active methylene compound or alkali, is added the proteidal residues above referred to, to form a filler or binder. These residues may be used alone or they may be mixed with fibrous material, leather waste or similar material. Also, if desired, a suitable pigment dye or other coloring matter may be added.

The composition produced as above is highly efficient for use in the manufacture of various commercial products, such a linoleum, wood carpet, floor coverings, boards, tile, insulating compound, rubber substitute, celluloid-like articles (of low quality) and the like. It is exceedingly cheap to produce, is non-inflammable, and can be easily rolled, worked or molded into the desired form. It is strong and durable, and the degree of hardness or softness of the final products can be readily controlled by varying the proportion of glutinizing or condensing agent employed.

The composition is immediately available for use in the manufacture of commercial products and the articles made therefrom do not require a long drying period or operation.

For a cheap or low grade article or composition to be worked up into an article of commerce, the residues obtained from the operations of separating and precipitating the refined proteids, may be glutinized, and treated in the manner above described with reference to the refined proteids.

The following examples will serve to illustrate the manner of carrying out my invention.

Example: The proteids or proteidal substances are separated from the mass of raw material and kneaded with cresol and is again kneaded after the addition thereto of oxidized castor oil. The resulting mass is kneaded a third time after adding thereto a small quantity of concentrated caustic soda solution, and a suitable quantity of the proteidal residue left from the operation of separating the proteids from the mass of raw material. The composition is now ready for use in the manufacture of any desired commercial product. If linoleum, wood carpet, floor covering, boards, or the like, are to be produced, the mass is rolled hot to the desired thickness and size. If desired the composition may be applied to any suitable fabric under a hot roll. If a molded article is desired the composition is formed into the desired shape in molds or dies in a press.

Having now set forth the objects and nature of my invention and the method of carrying the same into practical operation what I claim as new and useful, and of my own invention, and desire to secure by Letters Patent is:—

1. In the manufacture of plastic compositions, the process which consists in separating vegetable proteids from vegetable proteids-containing material, then glutinizing the separated proteids and mixing with the glutinized mass the residue of the material from which the proteids have been separated.

2. In the manufacture of plastic compositions, the process which consists in separating vegetable proteids from proteid containing material, and then glutinizing the residue from the separating operations.

3. In the manufacture of plastic compositions, the process which consists in separating vegetable proteids from proteid containing material, and then glutinizing the residue from the separating operations, and condensing the glutinized mass.

4. As a new article of manufacture a plastic composition containing glutinized vegetable proteids and a filler or binder composed of the residue of the raw material from which the proteids are obtained.

In testimony whereof I have hereunto set my hand on this 3rd day of May A. D., 1917.

SADAKICHI SATOW.